(12) United States Patent
Barhorst et al.

(10) Patent No.: US 9,950,394 B2
(45) Date of Patent: Apr. 24, 2018

(54) SYSTEMS AND METHODS FOR WELDING ELECTRODES

(75) Inventors: Steven Barhorst, Sidney, OH (US); Mario Amata, Dublin, OH (US)

(73) Assignee: Hobart Brothers Company, Troy, OH (US)

(*) Notice: Subject to any disclaimer, the term of this patent is extended or adjusted under 35 U.S.C. 154(b) by 1505 days.

(21) Appl. No.: 13/418,148

(22) Filed: Mar. 12, 2012

(65) Prior Publication Data
US 2013/0233839 A1 Sep. 12, 2013

(51) Int. Cl.
| | |
|---|---|
| B23K 9/23 | (2006.01) |
| B23K 35/02 | (2006.01) |
| B23K 35/36 | (2006.01) |
| B23K 35/362 | (2006.01) |
| B23K 35/368 | (2006.01) |
| B23K 35/38 | (2006.01) |

(52) U.S. Cl.
CPC .............. *B23K 35/36* (2013.01); *B23K 35/02* (2013.01); *B23K 35/0255* (2013.01); *B23K 35/0261* (2013.01); *B23K 35/0266* (2013.01); *B23K 35/3601* (2013.01); *B23K 35/362* (2013.01); *B23K 35/3603* (2013.01); *B23K 35/368* (2013.01); *B23K 35/38* (2013.01); *B23K 35/383* (2013.01)

(58) Field of Classification Search
CPC .. B23K 35/0261; B23K 35/36; B23K 35/362; B23K 35/368; B23K 35/38
USPC .............................. 219/137 WM, 145.1, 136
See application file for complete search history.

(56) References Cited

U.S. PATENT DOCUMENTS

| | | | |
|---|---|---|---|
| 2,329,410 A * | 9/1943 | Morrison | 219/128 |
| 2,552,105 A | 5/1951 | Miller | |
| 3,175,074 A * | 3/1965 | Culbertson | 219/146.32 |
| 3,778,588 A | 12/1973 | Bishel | |
| 3,995,139 A * | 11/1976 | Bouvard | 219/146.51 |
| 4,913,927 A * | 4/1990 | Anderson | 427/580 |
| 5,233,160 A * | 8/1993 | Gordish et al. | 219/137 WM |
| 6,274,845 B1 | 8/2001 | Stava et al. | |
| 6,723,954 B2 | 4/2004 | Nikodym et al. | |
| 6,846,536 B1 * | 1/2005 | Priesnitz et al. | 428/36.91 |
| 7,087,860 B2 | 8/2006 | Nikodym et al. | |
| 2002/0185481 A1* | 12/2002 | Bjorkman et al. | 219/146.22 |
| 2003/0136774 A1 | 7/2003 | Nikodym | |
| 2004/0140303 A1* | 7/2004 | Kataoka et al. | 219/137 WM |
| 2008/0029185 A1 | 2/2008 | Tseng | |

(Continued)

FOREIGN PATENT DOCUMENTS

| | | |
|---|---|---|
| JP | S57130796 | 8/1982 |
| JP | S58205696 | 11/1983 |

(Continued)

*Primary Examiner* — Dana Ross
*Assistant Examiner* — Ket D Dang
(74) *Attorney, Agent, or Firm* — McAndrews, Held & Malloy, Ltd.

(57) ABSTRACT

The invention relates generally to welding and, more specifically, to electrodes for arc welding, such as Gas Metal Arc Welding (GMAW) or Flux Core Arc Welding (FCAW). In one embodiment, a tubular welding wire includes a sheath and a core. The core includes a carbon source and a potassium source that together comprise less than 10% of the core by weight. Furthermore, the carbon source is selected from the group: carbon black, lamp black, carbon nanotubes, and diamond.

17 Claims, 2 Drawing Sheets

(56) References Cited

U.S. PATENT DOCUMENTS

2009/0321404 A1* 12/2009 Keegan .................. 219/145.23
2011/0262340 A1* 10/2011 Krishna et al. .......... 423/445 R

FOREIGN PATENT DOCUMENTS

| JP | S6478699 | 3/1989 |
| JP | H01254396 | 10/1989 |
| JP | H03146295 | 6/1991 |
| JP | H0866792 | 3/1996 |
| JP | H11207491 | 8/1999 |
| JP | 2003145291 | 5/2003 |
| JP | 2006090612 A * | 4/2006 |
| JP | 2008030121 | 2/2008 |
| JP | 2008087045 | 4/2008 |
| JP | 2008213042 | 9/2008 |
| JP | 2009172679 | 8/2009 |
| JP | 2010501350 | 1/2010 |
| JP | 2010253511 | 11/2010 |

* cited by examiner

SYSTEMS AND METHODS FOR WELDING ELECTRODES

BACKGROUND

The invention relates generally to welding and, more specifically, to electrodes for arc welding, such as Gas Metal Arc Welding (GMAW) or Flux Core Arc Welding (FCAW).

Welding is a process that has become ubiquitous in various industries for a variety of applications. For example, welding is often used in applications such as shipbuilding, offshore platform, construction, pipe mills, and so forth. Certain welding techniques (e.g., Gas Metal Arc Welding (GMAW), Gas-shielded Flux Core Arc Welding (FCAW-G), and Gas Tungsten Arc Welding (GTAW)), typically employ a shielding gas (e.g., argon, carbon dioxide, or oxygen) to provide a particular local atmosphere in and around the welding arc and the weld pool during the welding process, while others (e.g., Flux Core Arc Welding (FCAW), Submerged Arc Welding (SAW), and Shielded Metal Arc Welding (SMAW)) do not. Additionally, certain types of welding may involve a welding electrode in the form of welding wire. Welding wire may generally provide a supply of filler metal for the weld as well as provide a path for the current during the welding process. Furthermore, certain types of welding wire (e.g., tubular welding wire) may include one or more components (e.g., flux, arc stabilizers, or other additives) that may generally alter the welding process and/or the properties of the resulting weld.

BRIEF DESCRIPTION

In one embodiment, a tubular welding wire electrode includes a sheath and a core. The core includes a carbon source and a potassium source that together comprise less than 10% of the core by weight. Furthermore, the carbon source is selected from the group: carbon black, lamp black, carbon nanotubes, and diamond.

In another embodiment, a welding method includes feeding a welding wire electrode into a welding apparatus. The welding wire electrode includes a core and a sheath, and the core comprises a carbon source and a stabilizer that together comprise less than 10% of the core by weight. The method further includes forming a welding arc between the welding wire electrode and a coated metal workpiece.

In another embodiment, a welding system includes a welding torch configured to receive a welding wire electrode. The welding wire electrode includes a carbon source and an alkali metal source that together comprise less than 10% of the welding wire electrode by weight. Furthermore, the welding torch is configured to cyclically move the welding wire electrode in a desired pattern while maintaining an arc between the welding wire electrode and a workpiece.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As mentioned, certain types of welding electrodes (e.g., tubular welding wire) may include one or more components (e.g., flux, arc stabilizers, or other additives) that may generally alter the welding process and/or the properties of the resulting weld. Accordingly, the present disclosure is directed toward welding electrode compositions incorporating various forms of carbon (e.g., graphite, graphene, carbon black, lamp black, diamond, or similar carbon sources) to stabilize the arc and/or alter the chemistry (e.g., increase the carbon content) of the weld. Furthermore, the present welding electrode embodiments may further include other stabilizers, such as alkali metal compounds (i.e., compounds of Group 1 elements, such as lithium (Li), sodium (Na), potassium (K), rubidium (Rb) or cesium (Cs)), alkaline earth metal compounds (i.e., compounds of Group 2 elements, such as beryllium (Be), magnesium (Mg), calcium (Ca), strontium (Sr), barium (Ba)), rare earth silicides, as well as other elements (e.g., titanium, manganese, or similar elements) and minerals (e.g., pyrite, magnetite, and so forth). As discussed below, the disclosed welding electrodes may enable the welding of coated workpieces (e.g., plated, galvanized, painted, aluminized, carburized, or similarly coated workpieces) and/or thinner workpieces (e.g., 20-, 22-, 24-gauge, or thinner workpieces). Additionally, the disclosed welding electrodes generally enable acceptable welds under different welding configurations (e.g., direct current electrode negative (DCEN), direct current electrode positive (DCEP), variable polarity, pulsed direct current (DC), balanced or unbalanced alternating current (AC) polarity waveforms) and different welding methods (e.g., involving circular or serpentine welding electrode movements during welding).

It should be appreciated that, as used herein, the term "tubular welding electrode" or "tubular welding wire" may refer to any welding wire or electrode having a metal sheath and a granular or powdered core, such as metal-cored or flux-cored welding electrodes. It should also be appreciated that the term "stabilizer" may be generally used to refer to any component of the tubular welding that affords improves the quality of the arc and/or weld.

Figure 1:
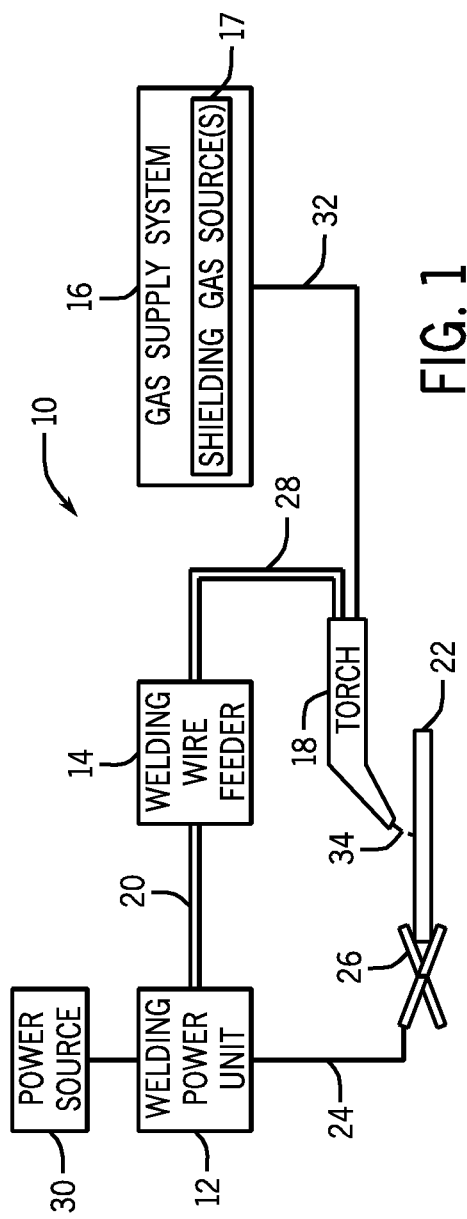
FIG. 1 is a block diagram of a gas metal arc welding (GMAW) system, in accordance with embodiments of the present disclosure.

Turning to the figures, FIG. 1 illustrates an embodiment of a gas metal arc welding (GMAW) system 10 that utilizes a welding electrode (e.g., tubular welding wire) in accordance with the present disclosure. It should be appreciated that, while the present discussion may focus specifically on the GMAW system 10 illustrated in FIG. 1, the presently disclosed welding electrodes may benefit any arc welding process (e.g., FCAW, FCAW-G, GTAW, SAW, SMAW, or similar arc welding process) that uses a welding electrode. The welding system 10 includes a welding power unit 12, a welding wire feeder 14, a gas supply system 16, and a welding torch 18. The welding power unit 12 generally supplies power to the welding system 10 and may be coupled to the welding wire feeder 14 via a cable bundle 20 as well as coupled to a workpiece 22 using a lead cable 24 having a clamp 26. In the illustrated embodiment, the welding wire feeder 14 is coupled to the welding torch 18 via a cable bundle 28 in order to supply consumable, tubular welding wire (i.e., the welding electrode) and power to the welding torch 18 during operation of welding system 10. In another embodiment, the welding power unit 12 may couple and directly supply power to the welding torch 18.

The welding power unit 12 may generally include power conversion circuitry that receives input power from an alternating current power source 30 (e.g., an AC power grid, an engine/generator set, or a combination thereof), conditions the input power, and provides DC or AC output power via the cable 20. As such, the welding power unit 12 may power the welding wire feeder 14 that, in turn, powers the welding torch 18, in accordance with demands of the welding system 10. The lead cable 24 terminating in the clamp 26 couples the welding power unit 12 to the workpiece 22 to close the circuit between the welding power unit 12, the workpiece 22, and the welding torch 18. The welding power unit 12 may include circuit elements (e.g., transformers, rectifiers, switches, and so forth) capable of converting the AC input power to a direct current electrode positive (DCEP) output, direct current electrode negative (DCEN) output, DC variable polarity, pulsed DC, or a variable balance (e.g., balanced or unbalanced) AC output, as dictated by the demands of the welding system 10. It should be appreciated that the presently disclosed welding electrodes (e.g., tubular welding wire) may enable improvements to the welding process (e.g., improved arc stability and/or improved weld quality) for a number of different power configurations.

The illustrated welding system 10 includes a gas supply system 16 that supplies a shielding gas or shielding gas mixtures from one or more shielding gas sources 17 to the welding torch 18. In the depicted embodiment, the gas supply system 16 is directly coupled to the welding torch 18 via a gas conduit 32. In another embodiment, the gas supply system 16 may instead be coupled to the wire feeder 14, and the wire feeder 14 may regulate the flow of gas from the gas supply system 16 to the welding torch 18. A shielding gas, as used herein, may refer to any gas or mixture of gases that may be provided to the arc and/or weld pool in order to provide a particular local atmosphere (e.g., to shield the arc, improve arc stability, limit the formation of metal oxides, improve wetting of the metal surfaces, alter the chemistry of the weld deposit, and so forth). In certain embodiments, the shielding gas flow may be a shielding gas or shielding gas mixture (e.g., argon (Ar), helium (He), carbon dioxide ($CO_2$), oxygen ($O_2$), nitrogen ($N_2$), similar suitable shielding gases, or any mixtures thereof). For example, a shielding gas flow (e.g., delivered via conduit 32) may include Ar, $Ar/CO_2$ mixtures, $Ar/CO_2/O_2$ mixtures, Ar/He mixtures, and so forth.

Accordingly, the illustrated welding torch 18 generally receives the welding electrode (i.e., the tubular welding wire), power from the welding wire feeder 14, and a shielding gas flow from the gas supply system 16 in order to perform GMAW of the workpiece 22. During operation, the welding torch 18 may be brought near the workpiece 22 so that an arc 34 may be formed between the consumable welding electrode (i.e., the welding wire exiting a contact tip of the welding torch 18) and the workpiece 22. Additionally, as discussed below, by controlling the composition of the welding electrode (i.e., the tubular welding wire), the chemistry of the arc 34 and/or the resulting weld (e.g., composition and physical characteristics) may be varied. For example, the welding electrode may include fluxing or alloying components that may act as arc stabilizers and, further, may become at least partially incorporated into the weld, affecting the mechanical properties of the weld. Furthermore, certain components of the welding electrode (i.e., welding wire) may also provide additional shielding atmosphere near the arc, affect the transfer properties of the arc, and/or deoxidize the surface of the workpiece.

Figure 2:
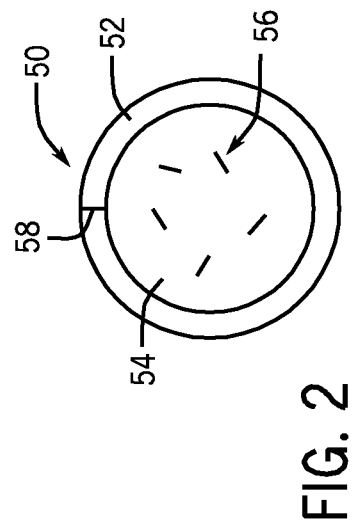
FIG. 2 is a cross-sectional view of a tubular welding electrode, in accordance with embodiments of the present disclosure.

A cross-section of an embodiment of the presently disclosed welding electrodes is illustrated in FIG. 2. FIG. 2 illustrates a tubular welding electrode 50 (e.g., tubular welding wire 50) that includes a metallic sheath 52 that encapsulates a granular or powdered core 54. The metallic sheath 52 may be manufactured from any suitable metal or alloy (e.g., high-carbon steel, low-carbon steel, or other suitable metal or alloy). It should be appreciated that since the metallic sheath 52 may generally provide the filler metal for the weld, the composition of the metallic sheath 52 may affect the composition of the resulting weld. As such, the metallic sheaths 52 may include additives or impurities (e.g., iron oxides, carbon, alkali metals, manganese, or similar compounds or elements) that may be selected to provide desired weld properties. The granular core 54 of the illustrated tubular welding electrode 50 may generally be a compacted powder with a composition that, as discussed below, may include a carbon source and an alkali metal compound in certain embodiments. The carbon source, the alkali metal compound, and other components (e.g., other fluxing or alloying components) may be homogenously or non-homogenously (e.g., in clumps or clusters 56) disposed within the granular core 54. Additionally, for certain welding electrode embodiments (e.g., a metal-cored welding electrode), the granular core 54 may include one or more metals (e.g., iron, iron oxides, or other metals) that may provide at least a portion of the filler metal for the weld.

Examples of components that may be present within the tubular welding electrode 50 (i.e., in addition to the one or more carbon sources and the one or more alkali metal compounds) include other stabilizing, fluxing, and alloying components, such as may be found in METALLOY X-CEL™ welding electrodes available from Illinois Tool Works, Inc. Generally speaking, the total percentage of the combination of the one or more carbon sources and the one or more alkali metal compounds may be between approximately 0.01% and approximately 10% by weight, relative to the granular core 54 or the entire tubular welding electrode 50. It should be noted that the weight percentage generally refers to the contribution by weight of the potassium and carbon sources as a whole, not merely the elemental potassium or carbon contribution by weight. For example, in certain embodiments, the total percentage of the combination of the one or more carbon sources and the one or more alkali metal compounds may be between approximately 0.01% and approximately 8%, between approximately 0.05% and approximately 5%, or between approximately 0.1% and approximately 4%. It should be appreciated that, under the conditions of the arc 34, the components of the welding wire (e.g., the metal sheath 52, the granular core 54, and so forth) may change physical state, chemically react (e.g., oxidize, decompose, and so forth), or become incorporated into the weld substantially unmodified by the weld process.

The carbon source present in the granular core 54 and/or the metal sheath 52 may be in a number of forms and may stabilize the arc 34 and/or increase the carbon content of the weld. For example, in certain embodiments, graphite, graphene, nanotubes, fullerenes or similar substantially $sp^2$-hybridized carbon source may be utilized as the carbon source in the tubular welding electrode 50. Furthermore, in certain embodiments, graphene or graphite may be used to also provide other components (e.g., moisture, gases, metals, and so forth) that may be present in the interstitial space between the sheets of carbon. In other embodiments, substantially sp$^3$-hybridized carbon sources (e.g., micro- or nano-diamond, carbon nanotubes, buckyballs) may be used as the carbon source. In still other embodiments, substantially amorphous carbon (e.g., carbon black, lamp black, soot, or similar amorphous carbon sources) may be used as the carbon source. Furthermore, while the present disclosure may refer to this component as a "carbon source," it should be appreciated that the carbon source may be a chemically modified carbon source that may contain elements other than carbon (e.g., oxygen, halogens, metals, and so forth). For example, in certain embodiments, the tubular welding electrode 50 may include a carbon black carbon source (e.g., in the granular core 54 and/or the metallic sheath 54) that may contain a manganese content of approximately 20%.

Additionally, the tubular welding electrode 50 may also include one or more alkali metal compounds to stabilize the arc 34. That is, the granular core 54 and/or the metallic sheath 52 of the tubular welding electrode 50 may include one or more compounds of the Group 1 and Group 2 elements, i.e., lithium (Li), sodium (Na), potassium (K), rubidium (Rb), cesium (Cs), beryllium (Be), magnesium (Mg), calcium (Ca), strontium (Sr), or barium (Ba). A non-limiting list of example compounds include: Group 1 (i.e., alkali metal) and Group 2 (i.e., alkaline earth metal) silicates, titanates, manganese titanate, alginates, carbonates, halides, phosphates, sulfides, hydroxides, oxides, permanganates, silicohalides, feldspars, pollucites, molybdenites, and molybdates. For example, in an embodiment, the granular core 54 of the tubular welding electrode 50 may include potassium manganese titanate, potassium sulfate, sodium feldspar, potassium feldspar, and/or lithium carbonate. Similar examples of carbon sources and alkali metal compounds that may be used are described in U.S. Pat. No. 7,087,860, entitled "STRAIGHT POLARITY METAL CORED WIRES," and U.S. Pat. No. 6,723,954, entitled "STRAIGHT POLARITY METAL CORED WIRE," which are both incorporated by reference in their entirety for all purposes.

Additionally, the tubular welding electrode 50 may also include other stabilizing components. Rare earth elements may generally provide stability to the arc 34 and may affect the properties of the resulting weld. For example, in certain embodiments, the tubular welding electrode 50 may use rare earth silicides, such as the Rare Earth Silicide (e.g., available from Miller and Company of Rosemont, Ill.), which may include rare earth elements (e.g., cerium). Furthermore, the tubular welding electrode 50 may, additionally or alternatively, include other elements and/or minerals to provide arc stability and to control the chemistry of the resulting weld. For example, in certain embodiments, the granular core 54 and/or the metallic sheath 52 of the tubular welding electrode 50 may include certain elements (e.g., titanium, manganese, zirconium, fluorine, or other elements) and/or minerals (e.g., pyrite, magnetite, and so forth). By specific example, certain embodiments may include zirconium silicide, nickel zirconium, or alloys of titanium, aluminum, and/or zirconium in the granular core 54. In particular, sulfur containing compounds, including various sulfide, sulfate, and/or sulfite compounds (e.g., such as molybdenum disulfide, manganese sulfite, barium sulfate, calcium sulfate, or potassium sulfate) or sulfur-containing compounds or minerals (e.g., pyrite, gypsum, or similar sulfur-containing species) may be included in the granular core 54 to improve the quality of the resulting weld by improving bead shape and facilitating slag detachment, which may be especially useful when welding galvanized workpieces, as discussed below.

Generally speaking, the tubular welding electrode 50 may generally stabilize the formation of the arc 34 to the workpiece 22. As such, the disclosed tubular welding electrode 50 may improve deposition rates while reducing splatter during the welding process. It should further be appreciated that the improved stability of the arc 34 may generally enable the welding of coated metal workpieces. A non-limiting list of example coated workpieces includes painted, sealed, galvanized, galvanealed, plated (e.g., nickel-plated, copper-plated, tin-plated, or electroplated or chemically plated using a similar metal), chromed, nitrite-coated, aluminized, or carburized workpieces. For example, in the case of galvanized workpieces, the presently disclosed tubular welding electrode 50 may generally improve the stability and the penetration of the arc 34 such that a good weld may be achieved despite the zinc coating on the outside of the workpiece 22. Additionally, by improving the stability of the arc 34, the disclosed tubular welding electrode 50 may generally enable the welding of thinner workpieces than may be possible using other welding electrodes. For example, in certain embodiments, the disclosed tubular welding electrode 50 may be used to weld metal having an approximately 16-, 20-, 22-, 24-gauge, or even thinner workpieces.

Furthermore, the disclosed tubular welding electrode 50 may also be combined with certain welding methods or techniques (e.g., techniques in which the welding electrode moves in a particular manner during the weld operation) that may further increase the robustness of the welding system 10 for particular types of workpieces. For example, in certain embodiments, the welding torch 18 may be configured to cyclically or periodically move the electrode in a desired pattern (e.g., a circular, spin arc, or serpentine pattern) within the welding torch 18 in order to maintain an arc 34 between the tubular welding electrode 50 and the workpiece 22 (e.g., only between the sheath 52 of the tubular welding electrode 50 and the workpiece 22). By specific example, in certain embodiments, the disclosed tubular welding electrode 50 may be utilized with welding methods such as those described in provisional U.S. Patent Application Ser. No. 61/576,850, entitled "DC ELECTRODE NEGATIVE ROTATING ARC WELDING METHOD AND SYSTEM," which is incorporated by reference herein in its entirety for all purposes. It should be appreciated that such welding techniques may be especially useful when welding thin workpieces (e.g., having 20-, 22-, or 24-gauge thickness), as mentioned above.

Figure 3:
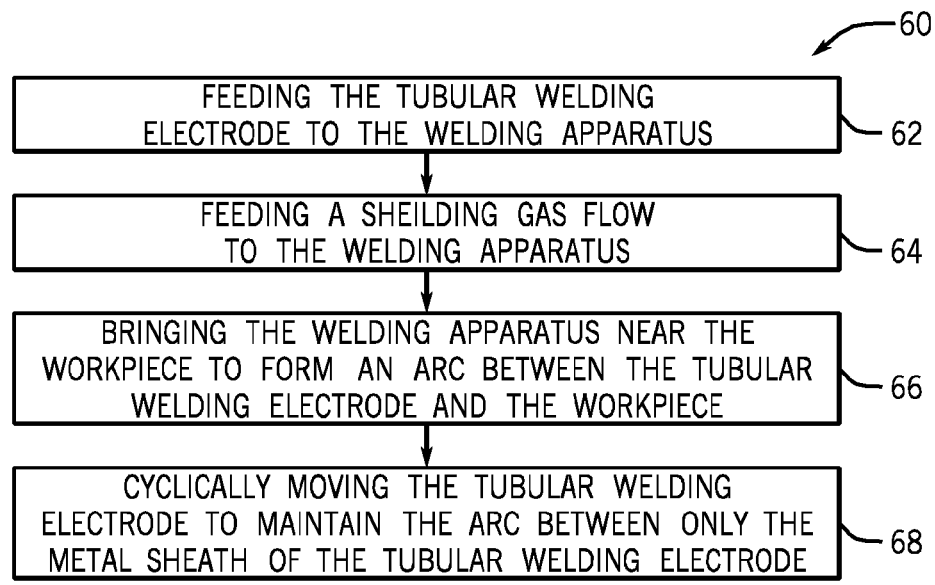
FIG. 3 is a process by which the tubular welding electrode may be used to weld a workpiece, in accordance with embodiments of the present disclosure.

FIG. 3 illustrates an embodiment of a process 60 by which a workpiece 22 may be welded using the disclosed welding system 10 and tubular welding electrode 50. The illustrated process 60 begins with feeding (block 62) the tubular welding electrode 50 (i.e., the welding wire 50) to a welding apparatus (e.g., welding torch 18). Additionally, the process 60 includes providing (block 64) a shielding gas flow (e.g., 100% argon, 75% argon/25% carbon dioxide, 90% argon/10% helium, or similar shielding gas flow) near the contact tip of the welding apparatus (e.g., the contact tip of the torch 18). In other embodiments, welding systems may be used that do not use a gas supply system (e.g., such as the gas supply system 16 illustrated in FIG. 1) and one or more components (e.g., aluminum, iron, or magnesium oxides) of the tubular welding electrode 50 may provide a shielding gas component. Next, the tubular welding electrode 50 may be brought near (block 66) the workpiece 22 such that an arc 34 may be formed between the tubular welding electrode 50 and the workpiece 22. It should be appreciated that the arc 34 may be produced using, for example, a DCEP, DCEN, DC variable polarity, pulsed DC, balanced or unbalanced AC power configuration for the GMAW system 10. Furthermore, as mentioned above, in certain embodiments, the tubular welding electrode 50 may be cyclically or periodically moved (block 68) relative to the workpiece 22 according to a particular pattern and/or geometry (e.g., spinning arc, whirling pattern, or serpentine pattern) such that the arc 34 may be maintained (e.g., substantially between the metal sheath 52 of the tubular welding electrode 50 and the workpiece 22) during the welding process. Additionally, in certain embodiments, the tubular welding electrode 50 and/or the cyclical motion of the tubular welding electrode 50 during welding may generally enable the welding of thinner (e.g., less than 20 gauge) workpieces as well as painted, galvanized, galvanealed, plated, aluminized, chromed, carburized, or other similar coated workpieces.

Figure 4:
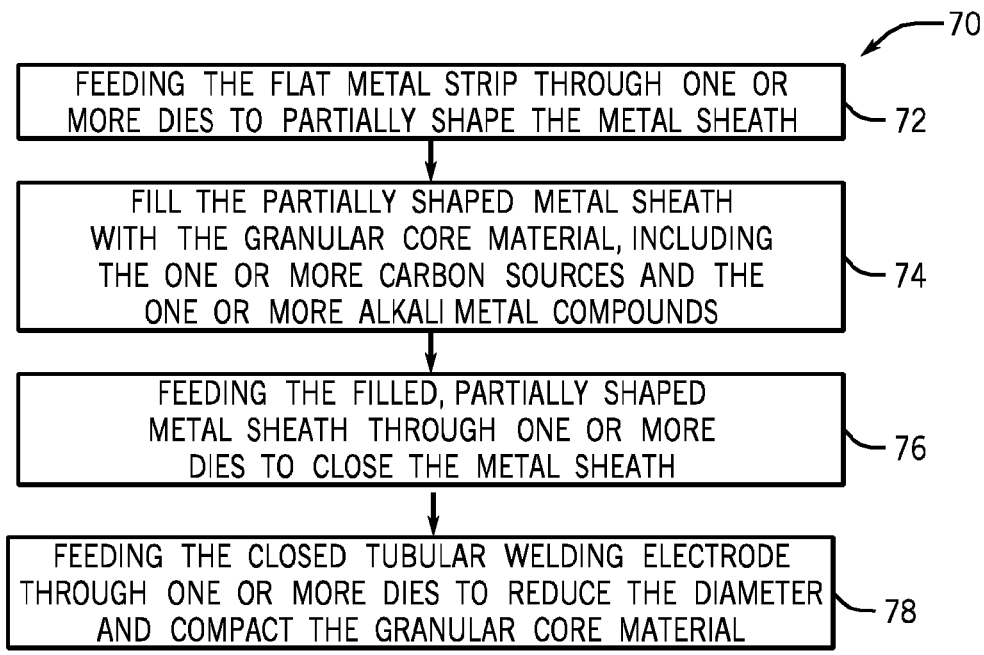
FIG. 4 is a process for manufacturing the tubular welding electrode, in accordance with embodiments of the present disclosure.

FIG. 4 illustrates an embodiment of a process 70 by which the tubular welding electrode 50 may be manufactured. The process 70 begins with a flat metal strip being fed (block 72) through a number of dies that shape the strip into a partially circular metal sheath 52 (e.g., producing a semicircle or trough). After the metal strip has been at least partially shaped into the metal sheath 52, it may be filled (block 74) with the granular core material 54. Accordingly, the partially shaped metal sheath 52 may be filled with various powdered fluxing and alloying components (e.g., iron oxide, zinc metal, or similar fluxing and/or alloying components). More specifically, among the various fluxing and alloying components, one or more carbon sources and one or more alkali metal compounds may be added such that together they comprise less than 10% of the tubular welding electrode 50 and/or the granular core material 54. Furthermore, in certain embodiments, other components (e.g., rare earth silicide, magnetite, titanate, pyrite, and/or other similar components) may also be added to the partially shaped metal sheath 52. Once the components of the granular core material 54 have been added to the partially shaped metal sheath 52, the partially shaped metal sheath 52 may then be fed through (block 76) one or more dies that may generally close the metal sheath 52 such that it substantially surrounds the granular core material 54 (e.g., forming a seam 58). Additionally, the closed metal sheath 52 may subsequently be fed through (block 78) a number of dies (e.g., drawing dies) to reduce the diameter of the tubular welding electrode 50 by compressing the granular core material 54.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A tubular welding wire, comprising:
 a sheath and a core, wherein the core comprises a carbon source and a potassium source that together comprise less than 10% of the core by weight, and wherein the core of the tubular welding wire includes a sulfur source comprising manganese sulfite, molybdenum disulfide, gypsum, calcium sulfate, barium sulfate, pyrite, or a combination thereof.

2. The tubular welding wire of claim 1, wherein the potassium source comprises potassium silicate, potassium titanate, potassium alginate, potassium carbonate, potassium fluoride, potassium phosphate, potassium sulfide, potassium hydroxide, potassium oxide, potassium permanganate, potassium silicofluoride, potassium feldspar, potassium molybdates, or a combination thereof.

3. The tubular welding wire of claim 1, wherein the tubular welding wire comprises rare earth silicide.

4. The tubular welding wire of claim 3, wherein the rare earth silicide comprises cerium silicide.

5. The tubular welding wire of claim 1, wherein the carbon source and the potassium source together comprise between 0.1% and 3% of the core by weight.

6. The tubular welding wire of claim 1, wherein the carbon source and the potassium source together comprise between 0.01% and 8% of the core by weight.

7. The tubular welding wire of claim 1, wherein the carbon source and the potassium source together comprise between 0.05% and 5% of the core by weight.

8. The tubular welding wire of claim 1, wherein the carbon source comprises carbon black.

9. The tubular welding wire of claim 8, wherein the carbon black includes manganese.

10. The tubular welding wire of claim 8, wherein the carbon black includes 20% manganese by weight.

11. The tubular welding wire of claim 1, wherein the carbon source comprises carbon nanotubes.

12. The tubular welding wire of claim 1, wherein the carbon source comprises fullerenes.

13. The tubular welding wire of claim 1, wherein the carbon source comprises nano-diamonds or micro-diamonds.

14. The tubular welding wire of claim 1, wherein the carbon source comprises graphite.

15. The tubular welding wire of claim 1, wherein the core comprises zirconium silicide.

16. The tubular welding wire of claim 1, wherein the core comprises zirconium nickel alloy.

17. The tubular welding wire of claim 1, wherein the core comprises titanium, manganese, and zirconium.

* * * * *